(12) United States Patent
Seidel et al.

(10) Patent No.: US 12,104,013 B2
(45) Date of Patent: Oct. 1, 2024

(54) METHOD FOR PREPARING POLYESTERS

(71) Applicant: TECHNIP ZIMMER GMBH, Frankfurt am Main (DE)

(72) Inventors: Eckhard Seidel, Frankfurt am Main (DE); Rainer Linke, Butzbach (DE)

(73) Assignee: Technip Zimmer GMBH, Frankfurt am Main (DE)

( * ) Notice: Subject to any disclaimer, the term of this patent is extended or adjusted under 35 U.S.C. 154(b) by 259 days.

(21) Appl. No.: 16/630,943

(22) PCT Filed: Jul. 17, 2017

(86) PCT No.: PCT/EP2017/068057
§ 371 (c)(1),
(2) Date: Jan. 14, 2020

(87) PCT Pub. No.: WO2019/015745
PCT Pub. Date: Jan. 24, 2019

(65) Prior Publication Data
US 2020/0157277 A1    May 21, 2020

(51) Int. Cl.
*C08G 63/85* (2006.01)
*C08G 63/183* (2006.01)
*C08K 3/34* (2006.01)

(52) U.S. Cl.
CPC ........... *C08G 63/85* (2013.01); *C08G 63/183* (2013.01); *C08K 3/34* (2013.01); *C08K 2201/005* (2013.01)

(58) Field of Classification Search
CPC ...... C08G 63/85; C08G 63/84; C08G 63/183; C08G 63/40; C08K 3/34; C08K 2003/2227; C08K 2201/002; C08K 2201/005
See application file for complete search history.

(56) References Cited

U.S. PATENT DOCUMENTS

| | | | |
|---|---|---|---|
| 4,032,550 A | 6/1977 | White et al. | |
| 4,304,675 A * | 12/1981 | Corey | A61L 9/01 252/506 |
| 5,143,984 A | 9/1992 | Jenkins et al. | |
| 5,187,216 A * | 2/1993 | Cassell | C08G 63/88 524/261 |
| 5,342,902 A | 8/1994 | Darnell et al. | |
| 6,284,232 B1 * | 9/2001 | Calton | A61L 9/01 424/76.1 |
| 6,657,040 B1 * | 12/2003 | Heitz | C08G 63/78 526/71 |
| 6,812,321 B1 * | 11/2004 | Heitz | C08G 63/78 526/71 |
| 2006/0135668 A1 | 6/2006 | Hayes | |
| 2015/0135668 A1 | 5/2015 | Seeberger | |
| 2017/0297997 A1 * | 10/2017 | Schraut | C07C 67/08 |

FOREIGN PATENT DOCUMENTS

| | | |
|---|---|---|
| DE | 196 27 591 A1 | 1/1997 |
| DE | 19627591 | 1/1997 |
| JP | 52-075684 | 6/1977 |
| JP | A-05-310902 | 11/1993 |
| JP | A2016-132721 | 7/2016 |
| JP | A2017-193687 | 10/2017 |
| WO | WO 9429378 A1 * 12/1994 | ............... C08K 3/34 |
| WO | WO 2016046118 A1 * 3/2016 | ............. C07C 67/08 |

OTHER PUBLICATIONS

Chinese Patent Office—Office Action dated Aug. 25, 2021 in Patent Application No. 2017800932205.
ISA/EP—Written Opinion of the International Search Authority—International Application No. PCT/EP2017/068057.
Japanese Patent Office—Office Action dated Dec. 23, 2020 in Patent Application No. 2020-502186.
European Office Action issued on Jun. 9, 2021—Application No. 17 752 012.9-1107.
Devroede, Jan—Study of the THF formation during the TPA-based synthesis of PBT—Technische Universiteit Eindhoven—Jan. 1, 2007.

* cited by examiner

*Primary Examiner* — Jane L Stanley
(74) *Attorney, Agent, or Firm* — Locke Lord LLP; Nicholas J. DiCeglie, Jr.; Gabrielle L. Gelozin

(57) ABSTRACT

The present application relates to a process for preparing polyesters comprising reacting a dicarboxylic acid with butanediol in the presence of a catalyst, wherein in the process an aluminosilicate is present, as well as the use of aluminosilicates in such a process.

10 Claims, No Drawings

METHOD FOR PREPARING POLYESTERS

This application is a national phase of PCT Application No. PCT/EP2017/068057 filed Jul. 17, 2017, the contents of which are hereby incorporated by reference.

The present invention relates to a method for preparing polyesters, in particular from dicarboxylic acids and butanediol, wherein an aluminosilicate is employed, as well as the use of an aluminosilicate in such a process.

EP 0698050 A1 relates to a method for preparing polytetrahydrofurane, wherein tetrahydrofurane (THF) and a zeolite catalyst are used.

DE000019638549A1 discloses the use of zeolite catalysts for the polycondensation of polyethyleneterephthalate.

However, this reference does not deal with polyesters based on butanediol (BD) and dicarboxylic acids.

Devroede, J. (2007), Study of the THF formation during TPA-based synthesis of PBT, Eindhoven: Technische Universität Eindhoven DOI: 10.6100/IR630627 presents the result of trials of polybutyleneterephthalat (PBT) in which aluminosilicates served as co-catalysts to tetrabutyl orthotitanate in the esterification of terephthalic acid (TPA) and transesterification of Dimethyl-terephthalate (DMT) with BD. Whereas aluminosilicates showed an efficient catalytic effect and THF reduction in the transesterification, not any catalytic activity but generation of a large THF quantity was found in the esterification reaction.

The synthesis of polyesters using dicarboxylic acids and BD in the presence of a catalyst usually takes place in the process steps of esterification, prepolycondensation, polycondensation, followed by polymer melt discharge and granulation.

During esterification, dicarboxylic acids and BD form esters in the presence of a catalyst. These pre-products are converted to the final polymer in the sub-sequent process steps as mentioned above.

During the whole process, but especially in the esterification reaction, the formation of THF from BD occurs as a side reaction. This reaction is acid-catalyzed and is therefore effective as a parallel reaction to the esterification, particularly in the initial phase of the esterification, in which there is still a large amount of free dicarboxylic acid. The THF formation increases the consumption of BD in the polyester production and leads to additional expenses for separation form the condensation water, processing to a marketable product or disposal.

The technical problem underlying the present invention is to provide a process for preparing polyesters using dicarboxylic acids and butanediol which avoids the above draw backs.

This is achieved by the subject-matter of the independent claims. Preferred embodiments are defined in the dependent claims.

The process of the present invention for preparing polyesters comprises reacting a dicarboxylic acid with butanediol in the presence of a catalyst, wherein in said process an aluminosilicate is present. By the reaction of the dicarboxylic acid and butanediol in the presence of the catalyst, polyesters are formed. By using an aluminosilicate in said process for preparing the polyester, the formation of THF from butanediol and the therewith associated drawbacks can be reduced. The aluminosilicate can be present in the reaction for preparing the polyester from the initial stage on.

In one embodiment, the process for preparing the polyester comprises the steps of esterification, prepolycondensation and polycondensation, which can be subsequently followed by polymer melt discharge and granulation. These are usual steps in the preparation of polyesters from dicarboxylic acids and butanediol so that the skilled person knows the material and parameters for carrying out these steps. The aluminosilicate can be present in particular in the step of esterification, for example at the starting point of the esterification step.

As mentioned out above, in the process for preparing the polyester, an aluminosilicate is present. Aluminosilicates are compounds having varying amounts of $Al_2O_3$ and $SiO_2$. Silicon is surrounded by four oxygen atoms in the form of a tetrahedron, whereas Al is provided in the form of an octahedron. Aluminosilicates are compounds in which Al also occupies Si sites and is coordinated by four oxygen atoms. An example of aluminosilicates are zeolites, wherein in an embodiment the aluminosilicate can be a 4A-type zeolite.

The aluminosilicate can have the formula $Na_2O \cdot Al_2O_3 \cdot 2SiO_2 \cdot nH_2O$.

In a further embodiment, the aluminosilicate can have a pore size of about 4 Å and/or the aluminosilicate can have a particle size $d_{50}$ of 0.1 to 0.5 μm. The pore size and the particle size are usual parameters in the field of aluminosilicates/zeolites so that they can be determined in the usual way in this technical field.

In an embodiment, the aluminosilicate can be a synthetic and/or crystalline aluminosilicate.

The aluminosilicate can be provided in the form of a powder, and in particular it can be added to the reaction mixture for preparing the polyester in the form of a powder.

With the above described aluminosilicates, the amount of THF can be reduced effectively, which is formed in the process for preparing the polyester from a dicarboxylic acid and butanediol.

As mentioned above, in the process for preparing the polyester a catalyst is employed for catalyzing the reaction between the dicarboxylic acid and the butanediol. In particular, the catalyst can be a tetrabutyl orthotitanate.

In the above process for preparing the polyester, a dicarboxylic acid is employed. It is possible to use one dicarboxylic acid or a mixture of two or more carboxylic acids being different from each other.

In an embodiment, the dicarboxylic acid can be an aromatic dicarboxylic acid with one or two aromatic rings, in particular terephthalic acid, isophthalic acid, and naphthalene dicarboxylic acids. The dicarboxylic acid can also be an aliphatic dicarboxylic acid having 2 to 16 C-atoms, in particular succinic acid, glutaric acid, adipic acid, and suberic acid.

The amount of the aluminosilicate can be 100 to 1 000 ppm referred to the final polymer product.

The relation of the catalyst concentration to the aluminosilicate concentration can be 2:1 to 1:40 expressed in ppm.

As mentioned above, the process for preparing the polyester from the reaction of dicarboxylic acid with butanediol can be carried out in the steps of esterification, prepolycondensation and polycondensation.

In an embodiment, the esterification can be carried out by applying at least one of the following parameters:
molar ratio of dicarboxylic acid to butanediol is 0.5 to 1.5;
esterification temperature is 165° C. to 260° C. but below the thermal impairment of the dicarboxylic acid;
pressure is 1200 mbar to 200 mbar;
catalyst concentration is 25 ppm-200 ppm referring to the final product; and
the concentration of the aluminosilicate is 100-1000 ppm referring to the final product.

The esterification can be carried out in particular by applying all of the above parameters.

In an embodiment, the prepolycondensation can be carried out by applying at least one of the following parameters:
temperature is 230° C.-260° C., but below of the thermal impairment of the dicarboxylic acid; and
pressure is 600 mbar-20 mbar.

In particular, the prepolycondensation can be carried out by applying the above parameters together.

In one embodiment, the polycondensation can be carried out by applying at least one of the following parameters:
temperatures of 235° C. to 265° C. but below of the thermal impairment of the dicarboxylic acid; and
pressure can be <1 mbar.

In particular, the polycondensation can be carried out by applying the above parameters together.

The present invention relates also to the use of the aluminosilicate in a process for preparing polyesters comprising reacting a dicarboxylic acid with butanediol in the presence of a catalyst, wherein the process and the compounds used in the process are as defined above.

With the present invention, in particular with the above described embodiments, several advantages can be achieved. The use of the aluminosilicate, in particular as defined above, reduces the formation of THF to a great extent without influence of the catalyst and its activity to esterification, prepolycondensation and polycondensation. Thereby, a substantially lower molar ration of dicarboxylic acid to THF formation and BD depletion can be used without fear that the polycondensation process is prematurely terminated due to THF formation and BD depletion and the target viscosity of the polymer is not reached. The esterification process can be controlled in such a way that from the beginning a high number of dicarboxylic acid BD monoesters and oligomeric monoesters are formed which exhibit a substantially higher reactivity in the polyester chain building and lead to a considerable process acceleration. In contrast, the dicarboxylic acid-BD-diesters or oligomeric diesters formed with a higher BD excess need many trans-esterification steps to remove the redundant BD.

Furthermore, the BD consumption can be optimized for polybutylene terephthalate (PBT), polybutylene adipate terephthalate (PBAT) and polybutylene succinate (PBS. The quantities of by-products is lowered, the process can be carried out faster and there is a high plant flexibility.

The present invention will be illustrated by the following example and comparative example, but it is to be noted that the example and comparative example shall not be construed to limit the invention thereto.

EXAMPLES

Example 1

1265.5 g TPA (terephthalic acid) and 1352.8 g adipic acid, 266.1 g butanediol, 1.29 g catalyst Tyzor TnBT (Dorf Ketal), a commercially available tetrabutyl orthotitanate catalyst (50 ppm Ti related to the final product)-1.82 g aluminosilicate powder of a particle size $d_{50}$ of 0.1 to 0.5 µm (500 ppm related to the final product) prepared for example from KÖSTROLITH® 4AP-TR having the formula $Na_2O \cdot Al_2O_3 \cdot 2SiO_2 \cdot nH_2O$, a 4A-type zeolite with a pore size of 4 Å, were treated 55 minutes in an esterification stage, whereas the target pressure of 600 mbar was achieved 10 minutes after start. The esterification reaction, the split off of water, started at a temperature of 173° C. (first drop of distillate) and increased until the end of esterification to 220° C.

During esterification, a distillate in a quantity of 727.9 g containing THF in a quantity of 83.7 g was obtained.

The final product is calculated from the monomers considering the theoretical polymer structure and statistical monomer distribution. Example 1 based on 3645 g final product.

Comparative Example 1

The same procedure as in Example 1 was carried out with the exception that no aluminosilicate was used.

The quantity of the distillate was 996 g, containing THF in a quantity of 278.2 g.

Comparing the THF quantity of Example 1 with that of Comparison Example 1, it is shown that by using an aluminosilicate in the process of preparing a polyester from dicarboxylic acids and butanediol, the amount of formed THF can be significantly reduced.

The invention claimed is:

1. A process for preparing polyesters comprising reacting, a dicarboxylic acid with a diol, wherein the diol is exclusively butanediol, in the presence of a catalyst, wherein in the process an aluminosilicate is present and wherein the aluminosilicate is a 4A-type zeolite;
wherein the process comprises the steps of esterification, prepolycondensation and polycondensation; and
wherein the esterification is carried out with a concentration of the aluminosilica between 100 and 1000 ppm with respect to the final product.

2. The process according to claim 1, wherein the aluminosilicate has the formula $Na_2O \cdot Al_2O_3 \cdot 2SiO_2 \cdot nH_2O$.

3. The process according to claim 1, wherein the aluminosilicate has a pore size of about 4 Å.

4. The process according to claim 1, wherein the aluminosilicate has a particle size $d_{50}$ of 0.1 to 0.5 µm.

5. The process according to claim 1, wherein the aluminosilicate is a synthetic and/or crystalline aluminosilicate.

6. The process according to claim 1, wherein the dicarboxylic acid is an aromatic dicarboxylic acid with one or two aromatic rings or an aliphatic dicarboxylic acid having 2 to 16 C-atoms.

7. The process according to claim 1, wherein the ratio of the catalyst concentration to the aluminosilicate concentration is between 2:1 and 1:40.

8. The process according to claim 1, wherein the esterification is carried out by applying at least one of the following parameters:
a molar ratio of dicarboxylic acid to butanediol between 0.5 and 1.5;
an esterification temperature between 165° C. and 260° C. but below the thermal impairment of the dicarboxylic acid;
a pressure between 1200 mbar and 200 mbar; and
a catalyst concentration between 25 ppm and 200 ppm with respect to the final product.

9. The process according to claim 1, wherein the prepolycondensation is carried out by applying at least one of the following parameters:
a temperature between 230° C. and 260° C., but below of the thermal impairment of the dicarboxylic acid; and
a pressure between 600 mbar and 20 mbar.

10. The process according to claim 1, wherein the polycondensation is carried out by applying at least one of the following parameter:

a temperature between 235° C. and 265° C. but below of the thermal impairment of the dicarboxylic acid; and
a pressure less than 1 mbar.

* * * * *